United States Patent

Kerchner

[15] 3,649,853
[45] Mar. 14, 1972

[54] ELECTRIC HEAT CONTROL SYSTEM
[72] Inventor: Charles F. Kerchner, Bath, Pa.
[73] Assignee: Kalglo Electronics Co., Inc., Lehigh Valley, Pa.
[22] Filed: Apr. 15, 1970
[21] Appl. No.: 28,659

[52] U.S. Cl. ............................307/310, 219/499, 219/501, 307/252 B
[51] Int. Cl. ..................................H03k 17/00, H05b 1/02
[58] Field of Search ...............307/252 B, 310; 219/494, 497, 219/499, 501, 508, 510

[56] References Cited

UNITED STATES PATENTS

| | | | |
|---|---|---|---|
| 3,341,769 | 9/1967 | Grant | 219/501 |
| 3,149,224 | 9/1964 | Horne et al. | 219/501 X |
| 3,440,397 | 4/1969 | Vesper et al. | 219/501 X |
| 3,407,286 | 10/1968 | Roby | 219/501 |
| 3,514,628 | 5/1970 | Pinckaers | 219/494 X |

Primary Examiner—John Zazworsky
Attorney—Robert A. Green

[57] ABSTRACT

The system of the invention includes a bridge circuit adapted to sense changes in the desired and set temperature of apparatus at a remote location. The system includes means for sensing unbalance in the bridge due to a change in the temperature of the apparatus at the remote location, the circuit including means for responding to the bridge unbalance and firing or operating a control circuit and a heating circuit for heating the apparatus.

10 Claims, 1 Drawing Figure

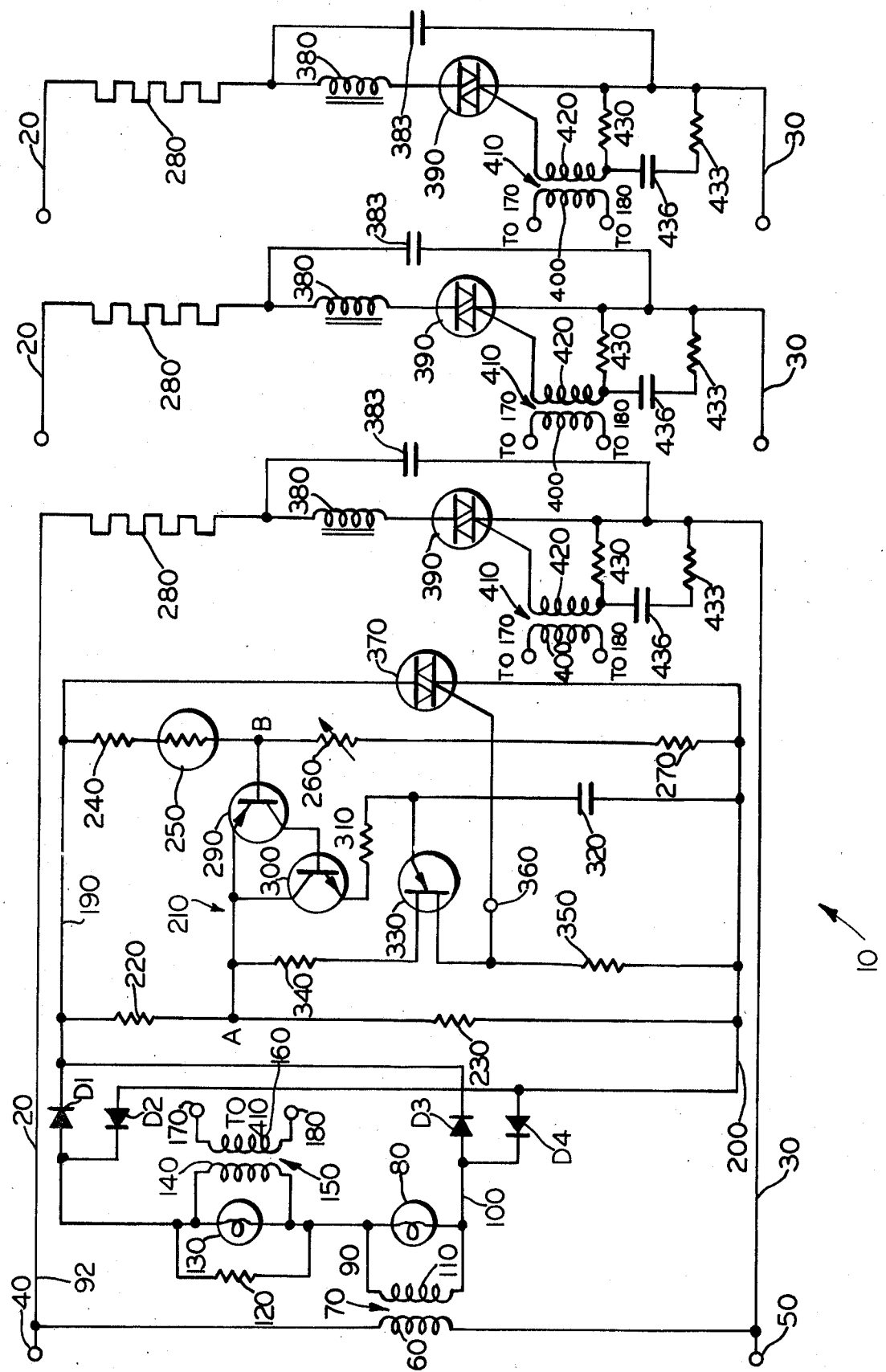

ELECTRIC HEAT CONTROL SYSTEM

BACKGROUND OF THE INVENTION

In the past, heating in an agricultural environment, for example, for maintaining temperature in chicken coops, pig pens, and the like, has been accomplished with equipment which used gas as a fuel rather than electricity. This has been done for economic reasons. Electric heat is desirable for a number of well known reasons; however, electric heating apparatus presently available is generally not satisfactory for agricultural or farm use because it is too sophisticated and too expensive to install and operate.

Various attempts have been made to achieve an economical method of heating electrically in an agricultural environment, the most significant being in the use of infrared heaters. However, with the use of this type of heating unit, since heat is applied the instant the heat lamps are energized and removed the instant they are deenergized a simple on-off thermostat cannot be used, or the animals will sense uncomfortable hot and cold periods. Thus, an electronic system which includes, among other things, means for modulating the heating voltage is required, and this is not known in the prior art.

The present invention provides a relatively inexpensive electronic heat control circuit which modulates the applied voltage, is simple to operate, and provides no failures, long term reliability, and can be packaged so that it is resistant to environmental damage.

SUMMARY OF THE INVENTION

Briefly, the electronic system of the invention comprises a resistance bridge which senses the temperature state at a remote location and includes associated means for applying appropriate portions of an input voltage pulse to the heating circuit.

DESCRIPTION OF THE DRAWINGS

The single FIGURE is a schematic representation of a system embodying the invention.

DESCRIPTION OF THE PREFERRED EMBODIMENTS

A system 10 embodying the invention and shown in the drawing includes primary buses 20 and 30 having input terminals 40 and 50 which are connected to a conventional 240 volt, 60 cycle power supply. The primary winding 60 of a transformer 70 is connected between the buses 20 and 30, and a first indicator light 80 is connected between the buses 90 and 100 coupled to the ends of the secondary winding 110 of the transformer 70. The bus 90 is coupled to a bus 92 through the parallel combination of resistor 120, indicator light 130, and primary winding 140 of a transformer 150 having a secondary winding 160 which is provided with terminals 170 and 180. The buses 92 and 100 are coupled through a full wave rectifier system including diodes D1, D2, D3, and D4, as is well known in the art, to bus 190 and bus 200 which are coupled to a portion of the system 10 which is called the control portion.

A resistance bridge circuit 210 is connected between the buses 190 and 200, and it includes a first leg which comprises resistor 220 and resistor 230 having a junction point A between them, and a second leg including resistor 240, thermistor 250, variable resistor 260 and resistor 270. Thermistor 250 and resistor 260 have a junction point B. Resistor 260 is used to set the desired temperature of the remote heating apparatus represented at 280, and thermistor 250 is also located at the site of the heating apparatus in a suitable radiation sensing enclosure. The bridge 210 also includes series-connected PNP-NPN transistors 290 and 300 connected between points A and B, with point B being connected to the base of transistor 290, the emitter of transistor 290 being connected to point A, the collector of transistor 290 being connected to the base of transistor 300, the collector of transistor 300 being connected to the emitter of transistor 290, and the emitter of transistor 300 being connected through resistor 310 and capacitor 320 to bus 200.

The bridge 210 also includes a unijunction transistor 330, known as a UJT, the emitter of which is connected to the junction of resistor 310 and capacitor 320, one base of which is connected through resistor 340 to junction point A, and the second base of which is connected through resistor 350 to the bus 200. An output terminal 360 is connected to the second base of unijunction transistor 330. The position of the UJT circuit between point A and bus 200 eliminates the need for a Zener diode across the whole bridge, as might be required in another arrangement.

The output terminal 360 associated with unijunction transistor 330 is connected to the gate of triac 370 which is connected as shown between the buses 190 and 200.

The bus 20 is connected through the heating element 280 of the remote heating device and a radio frequency inductor 380 to one end of a triac 390, the other end of which is connected to bus 30. A capacitor 383 which operates in conjunction with inductor 380 is connected across the inductor and triac 390 as shown. The terminals 170 and 180 of the secondary winding 160 of transformer 150 are connected to the primary winding 400 of a standard control power transformer 410, the secondary winding 420 of which is connected to the gate of triac 390 and through a combination of a resistor 430 in parallel with a series-connected resistor 433 and capacitor 436 to one terminal of the triac 390 and to bus 30.

According to the invention, the secondary winding 160 of transformer 150 can also be connected to other slave heating circuits including standard control power transformers 410 and triacs 390 and other remote heating load elements 280, as shown. If a triac such as RCA 2N5442 is used with proper heat-sinking, this circuit can control up to 8,000 watts of power per triac. Substantially any number of remote heating circuits may be controlled in this way, and this is desirable for large agricultural heating requirements.

In operation of the circuit 10, transformer 150 receives a 240 volt input and provides a reduced potential of 24 volts AC at its secondary, and this is applied across pilot light 80 which lights up and indicates that power is on. The diodes form a full wave rectifier and provide a series of voltage pulses across the bridge 210. The high resistance path of the bridge prevents the output indicator light 130 from lighting, and insufficient voltage is present to energize triac 390 through transformer 150.

If the bridge is unbalanced because the termistor 250 calls for heat, as the input pulse is generated between lines 190 and 200 across the bridge, at some time, point B goes positive and reaches a point at which transistors 290 and 300 conduct and charge capacitor 320. The point on the input pulse at which the transistors begin to conduct is determined by the potential at B, and this is determined by the unbalance of the bridge as determined by the temperature at the thermistor and the setting of resistor 260. When the charge on capacitor 320 reaches a predetermined value, the UJT 330 fires and discharges the capacitor and a positive potential appears at point 360 and at the gate of triac 370. Triac 370 fires, the voltage across the bridge 210 drops to zero, and the remainder of the voltage pulse at the secondary of transformer 70 is delivered to pilot light 130. The average output and brightness of the pilot light 130 depends on the ratio of delay angle to conduction angle. Pilot lights 80 and 130 provide an inexpensive and simple-to-operate visual reference system for indicating circuit operation. Since the pilot lights are located in the low voltage portion of the circuit instead of across the power input and output buses as in conventional circuits, low cost lamps with extremely long life expectancy can be utilized.

The voltage applied across light 80 appears across transformer 150. This produces a pulse across the secondary winding of transformer 150 which fires triac 390 which conducts the remainder of the voltage cycle through the heater load 280. This operating cycle is repeated with each input pulse until the heater reaches the desired temperature and the bridge is balanced. Presumably, during subsequent input pulses, the bridge will not be unbalanced and triacs 370 and 390 will not be energized.

Under other circumstances, heat lost and heat resupplied in each half cycle may be balanced so that transistors 290 and 300 will be turned on late in the input pulse and only a small burst of power will flow to the load.

It is noted that, if slave heating load circuits are provided, they, too, will receive heating power in the manner described above.

In the system shown, resistor 310 limits the emitter current of transistor 300, and limits the minimum delay angle at which the UJT 330 will fire and operate the heating circuit. This is necessary since, at very low temperatures, which might occur at initial turn-on of the heater, thermistor 250 has very high resistance. If resistor 260 was set to zero resistance for maximum power output, transistors 290 and 300 would saturate. This would cause gating of triac 370 too early in the half cycle, and this would cause misfiring. Resistors 220 and 230 should be relatively low in value (1) so that the shunting effect of the UJT and the phase shift networks will have minimum loading effect and (2) to provide the current necessary to supply the energy needed to charge capacitor 320.

Resistor 240 protects transistor 290 by providing isolation from direct supply voltage if thermistor 250 is shorted.

The circuit has a fail-safe feature in that, if thermistor 250 opens, power comes on full. This occurs because the infinite resistance of the open thermistor indicates low temperature. This type of fail-safe operation is desirable, instead of conventional arrangement of open thermistor-off circuit, since, if an animal bit off the control cable, the heat would not go off.

Resistor 120 is a low resistance, high power resistor to provide a reliable load for triac 370 to ensure proper circuit operation in case, for example, pilot light 130 should burn out. Also, it improves the power factor of the load of triac 370, thereby eliminating the possibility of false turnoff of the triac.

The capacitor 436 provided in the secondary winding of transformer 410 provides an initial leading inrush of current to trigger the triac 390 and the slave triacs 390 more reliably at low peak voltage conduction angles.

What is claimed is:

1. An electronic heat control circuit comprising an input power source,
    a load and a first gate connected across said power source,
    said input power source being coupled to the primary winding of a transformer having a secondary winding,
    a pilot light connected across said secondary winding,
    one end of said secondary winding being connected to one end of a first circuit including a resistor, a pilot light, and the primary winding of a power transformer, all connected in parallel,
    said power transformer being coupled to said first gate and said load,
    the other end of said secondary winding and the other end of said first circuit being coupled through a full wave rectifier across a resistance bridge circuit,
    said bridge circuit including first and second legs, one of which includes fixed resistors and the other of which includes a thermistor and a variable resistor, a cross arm between said legs including active circuit elements which respond to bridge unbalance to generate a signal,
    a normally blocking second gate connected across said bridge,
    said active circuit elements including means coupled to said second gate for unblocking said gate and permitting current to flow therethrough whereby voltage is coupled through said power transformer to said first gate whereby said first gate is operated and unblocked to permit input power to be applied to said load.

2. The circuit defined in claim 1 wherein said active elements include a pair of transistors coupled to a capacitor which is charged when said transistors turn on, and a unijunction transistor coupled to said capacitor and having an output coupled to said second gate for operating the same.

3. An electronic heat control system comprising
    an alternating current voltage source providing a cyclically varying input voltage,
    a first transformer having a primary winding and a secondary winding with said primary winding being connected across said voltage source,
    a second transformer having a primary winding and a secondary winding with the primary winding being connected in series with the secondary winding of said first transformer and the secondary winding being connected to a load circuit, and
    a variable resistance circuit connected across the series combination of said secondary winding of said first transformer and the primary winding of said second transformer, the resistance of said variable resistance circuit determining whether current flows through the second transformer to said load circuit in any portion of the input signal from said voltage source.

4. The system defined in claim 3 wherein said variable resistance circuit comprises a Wheatstone bridge and circuit means are coupled thereto for reducing the effective resistance of said bridge to zero at a selected point during each cycle of said input alternating current, if said bridge is unbalanced, whereby operating voltage can be applied to said second transformer and to said load circuit.

5. The system defined in claim 3 wherein a plurality of load circuits in parallel are connected across the secondary winding of said second transformer.

6. The system defined in claim 3 wherein said load circuit includes a third power transformer coupled between said second power transformer and a series-connected switch and heating load element.

7. The system defined in claim 5 wherein each said load circuit includes a third power transformer coupled between said second power transformer and a series-connected switch and heating load element.

8. The system defined in claim 3 and including a first pilot light across the secondary winding of said first transformer and a second pilot light across the primary winding of said second transformer, said first pilot light indicating the presence of an input signal and said second pilot light indicating the state of conduction of said load circuit.

9. The system defined in claim 4 wherein
    said bridge includes a capacitor coupled thereto and chargeable due to current flow therefrom when said bridge is unbalanced,
    a first switch coupled to said capacitor and adapted to operate and generate a pulse when said capacitor reaches a selected charged state,
    a second switch coupled to said first switch and adapted to be operated thereby to short circuit said bridge and to thereby permit current to flow through said second power transformer.

10. An electronic heat control system comprising
    a source of input power connected to a first transformer,
    a second power transformer in series with said first transformer,
    a resistance bridge circuit including a first gate connected across said first and second power transformers,
    a load circuit including a third power transformer and a second gate connected across said second power transformer,
    said bridge circuit drawing current preferentially rather than said load circuit when said bridge circuit is unbalanced,
    said bridge circuit including active circuit elements responsive to bridge circuit unbalance to generate a signal and to couple said signal to said first gate and thereby to operate said first gate, operation of said first gate causing input power to flow through said second power transformer and then to said third power transformer to said second gate for operating the same and thereby permitting power from said input source to flow to said load circuit.

* * * * *